United States Patent [19]

Kaku et al.

[11] Patent Number: 4,814,910

[45] Date of Patent: Mar. 21, 1989

[54] SMALL SIZED MAGNETIC RECORDING AND REPRODUCING APPARATUS WITH IMPROVED ROTATING MAGNETIC HEAD

[75] Inventors: Nobuyuki Kaku; Kenmei Masuda; Isamu Tsubono, all of Yokohama, Japan

[73] Assignee: Hitachi, Ltd., Tokyo, Japan

[21] Appl. No.: 54,864

[22] Filed: May 27, 1987

[30] Foreign Application Priority Data

May 27, 1986 [JP] Japan ................. 61-120249
Sep. 9, 1986 [JP] Japan ................. 61-210659

[51] Int. Cl.[4] ............................................. G11B 15/66
[52] U.S. Cl. ........................................ 360/85; 360/95; 360/130.22; 360/130.24
[58] Field of Search ..... 360/85, 84, 95, 130.22–130.24

[56] References Cited

U.S. PATENT DOCUMENTS

| | | | |
|---|---|---|---|
| 4,025,959 | 5/1977 | Warren | 360/85 |
| 4,595,961 | 6/1986 | Kuwajima | 360/130.24 |
| 4,614,315 | 9/1986 | Gerrits et al. | 360/85 X |

Primary Examiner—John H. Wolff
Attorney, Agent, or Firm—Antonelli, Terry & Wands

[57] ABSTRACT

A rotating magnetic head device in a magnetic recording and reproducing apparatus constructed as follows:
(1) A cylinder is composed of an upper fixed cylinder and a lower fixed cylinder, a recess is provided in the part of the upper fixed cylinder where a magnetic tape is not wound, and an inner lid, a top case or the like of the tape cassette is arranged (inserted) in the recess in overlapping fashion, thereby making it possible to reduce the size of the apparatus.
(2) A stator base which has a surface parallel to a rotary disc having magnetic heads placed thereon and which holds a clearance from the rotary member is disposed on the side of the rotary disc closer to the lower fixed cylinder, thereby to magnetically shield a rotary transformer unit from various electromagnetic components and to prevent the degradation of the signal-to-noise ratio of signal transmission attributed to the compaction of the apparatus, and further, various members are received within the lower fixed cylinder, thereby making it possible to heighten the packaging density of the received members and to reduce the size of the apparatus.

7 Claims, 9 Drawing Sheets

SMALL SIZED MAGNETIC RECORDING AND REPRODUCING APPARATUS WITH IMPROVED ROTATING MAGNETIC HEAD

BACKGROUND OF THE INVENTION

The present invention relates to a magnetic recording and reproducing apparatus, and more particularly to a rotating magnetic head (hereinbelow, simply termed "rotating head") device which is well suited to reduce the size of the apparatus and to stabilize the traveling of a tape and prevent the damage of the tape.

The present invention further relates to a rotating head device, and more particularly to a rotating head device which has built-in large-sized rotary transformers coping with the multi-channeling of signals and which is well suited for a smaller size owing to the reduction of the diameters of cylinders.

At the present time, there are high needs for reduction in the sizes of video tape recorders (VTR's), and various measures for reducing the sizes of mechanisms have been proposed. With any of the methods, however, the geometries of the entire mechanism are substantially determined by the sizes of a cassette and a rotating head device.

In this regard, an example which pursues the utmost limits of the size of the mechanism for system specifications such as the shapes of the cassette and the rotating head device is as disclosed in the official gazette of Japanese Patent Application Laid-open No. 171070/1984. This measure consists in that, as shown in FIG. 1 of the drawings annexed herewith, a ring 106 of the rotating head device is pressed into and caused to overlap the front opening 104 of the cassette 102, thereby to reduce the depth of an apparatus. Such a measure is effective for a system, for example, the VTR of 8 mm-FORMAT in which the opening of the cassette is large. In the figure, numeral 101 designates a tape guide drum, and numeral 103 designates tape part, respectively.

The prior art, however, has the following problems (1), (2), (3) and (4), which are more serious especially in a system of so-called wide-angle winding wherein a tape is wound round a rotating head over an angular extent of at least 180°:

(1) In order to insert the rotating head device into the opening of the cassette, this rotating head device needs to be arranged at a low position while avoiding the inner lid and top case of the cassette. This increases the height of the whole apparatus, and forms a factor obstructive of the thinning of the apparatus.

(2) For the purpose of arranging the rotating head device which is basically cylindrical, at the highest possible position within the cassette opening, preferably the angle of inclination of the rotating head device with respect to a chassis is made small so as to flatten the top surface of the rotating head device. Since, however, a tape is wound obliquely to the rotating head device, the heights of the tape parts obliquely traveling on the entrance side and exit side of the rotating head device become different. Accordingly, the traveling path of the tape becomes a multilevel one, and in particular, the tape lowers on the exit side, so that the whole apparatus thickens.

(3) In executing multilevel tape loadings on both the sides of the rotating head device, a loading mechanism becomes complicated, and this hampers reducing the size and lightening the weight of the apparatus.

(4) In the aforementioned case where the angle of winding of the tape round the rotating head is large, there is a place in which the traveling direction of the tape changes acutely, and hence, the smooth traveling performance of the tape is liable to degrade.

As disclosed in the official gazette of Japanese Patent Application Laid-open No. 150125/1980, another prior-art example has pursued the thinning of a rotating head device alone and therefore has a structure wherein electromagnetic components such as brushless motor parts, frequency generator (FG) parts and a rotary transformer are distributively arranged above and below the rotating plane of magnetic heads, namely, an arrangement wherein at least the rotary transformer and the brushless motor are distributed above and below a rotating drum on which the magnetic heads are mounted.

A tape cassette and the rotating head device combined with each other cannot be skillfully caused to overlap on account of the protrusion of, e. g., the lid of the tape cassette which is opened for drawing out a magnetic tape, so the combination hampers reduction in the horizontal area of the mechanism portion of a magnetic recording and reproducing apparatus carrying the rotating head device. That is, the prior art does not take it into account that the overlap between the tape cassette and the rotating head device is hampered by the protrusion of, e. g., the tape cassette lid to be opened for drawing out the tape, and it has had the problem that the reduction of the horizontal area of the mechanism portion of the magnetic recording and reproducing apparatus carrying the rotating head device is impeded.

Meanwhile, in a fixed cylinder device wherein the upper and lower cylinders of a rotating head device are fixed, an air film formed between a tape and the cylinders has heretofore been thin as compared with one in a rotary cylinder system. This is attributed to the absence of the effect of producing the air film as in the conventional rotary cylinder system. In the fixed cylinder device, accordingly, the traveling load of the tape enlarges due to a less or smoothing action based on the air film, and such problems as obstruction to stable traveling and damages to the tape have been prone to occur. These drawbacks have become more conspicuous as the tape thickness has been reduced for a lower rigidity and the tape surface roughened for a higher friction factor and an increase in the density of recording. Developments have therefore been made for forming a sufficient and stable air-smoothing layer also in the fixed cylinder device. An example thereof is as disclosed in the official gazette of Japanese Patent Application Laid-open No. 36361/1984. As shown in FIG. 2 of the drawings annexed herewith, the disclosed device is so constructed that spiral grooves 221 and 222 of the so-called pumping-out type which discharges out air in an internal space are provided between stationary portions including fixed cylinders 201, 202 and a rotating portion 216 including rotating heads, so as to form an air film between a tape and the cylinders. As a result, the contact of the tape with the cylinders is avoided or relieved, and the damage to the tape is eliminated, so that the qualities of recording and reproduction can be enhanced.

In FIG. 2, numeral 214 indicates a rotary shaft, numerals 203 indicate the magnetic heads, and numeral 218 indicates a coil.

The prior art, however, has been problematic in the points of machining and assembling costs for the reasons that the head rotating member needs to be formed with the spiral grooves of complicated shape and that the gaps between the grooves and the fixed cylinders need to be controlled to predetermined narrow intervals. Moreover, since the air is blown out uniformly over the whole outer peripheries of the cylinders, the air layer becomes thicker at the start part of tape winding where the tape exhibits a low tension. As a result, a non-uniform air film is formed, and non-uniformity in the magnetic contact between each rotating head and the tape arises to cause non-uniformity in the physical contact of the two. This has posed the problem that degradation in the contact between the tape and the head, namely, the head-to-tape contact is prone to be incurred.

SUMMARY OF THE INVENTION

An object of the present invention is to provide a device which is well suited especially for reducing the size of a magnetic recording and reproducing apparatus and for stabilizing the traveling of a tape and preventing the damages of the tape.

A further object of the present invention is to provide a device in which comparatively large-sized rotary transformers to cope with the multi-channeling of recording/reproduction signals can be built and which is well suited for reducing the size of a cylinder in order to realize high-density packaging of constituents.

To the accomplishment of the above objects, the present invention is constructed as follows:

(1) The cylinder is fabricated as a fixed cylinder which does not rotate with magnetic heads, and the part of the cylinder round which the magnetic tape is not wound is formed with a recess, in which the inner lid, the top case or the like of a tape cassette is arranged in an overlapping manner (that is, the aforementioned part of the cassette is inserted), thereby making it possible to reduce the size of the apparatus.

(2) Furthermore, the fixed cylinder is configured of an upper fixed cylinder and a lower fixed cylinder, the upper fixed cylinder is mounted on the upper part of a fixed shaft standing upright centrally of the lower fixed cylinder, and the recess is formed on the side of the upper fixed cylinder confronting the cassette. Thus, the cassette and the fixed cylinder are caused to overlap each other, and electromagnetic components such as a rotary member rotatable about the fixed shaft, a rotary disc carrying the plurality of magnetic heads, and the flat opposition type rotary transformers, are received within the lower fixed cylinder, thereby making it possible to heighten the packaging density of the constituents and to reduce the size of the apparatus.

(3) Besides, the gap between the fixed cylinder and the surface of the rotary disc carrying the rotating heads is put into a wedge shape which is broad at the start part of magnetic tape winding and which narrows toward the end part of the winding. Thus, owing to the varying gap, the magnitude of the air pressure between the rotary disc and the fixed cylinder is controlled to regulate the discharge amount of air, thereby to obviate the drawbacks concerning the air film which is formed between the magnetic tape and the cylinder in the prior-art fixed cylinder device, and to permit stabilizing the tape traveling and preventing the tape damages.

BRIEF DESCRIPTION OF THE DRAWINGS

FIG. 11(a) is a sectional view showing the relation between a rotating head device and a tape in a prior art device, while

FIG. 13(a) is a schematic plan view of a magnetic recording and reproducing apparatus in which the rotating head device shown in FIG. 12 is installed, while

DESCRIPTION OF THE PREFERRED EMBODIMENTS

Now, the embodiments of the present invention will be described with reference to the drawings.

Figure 1:
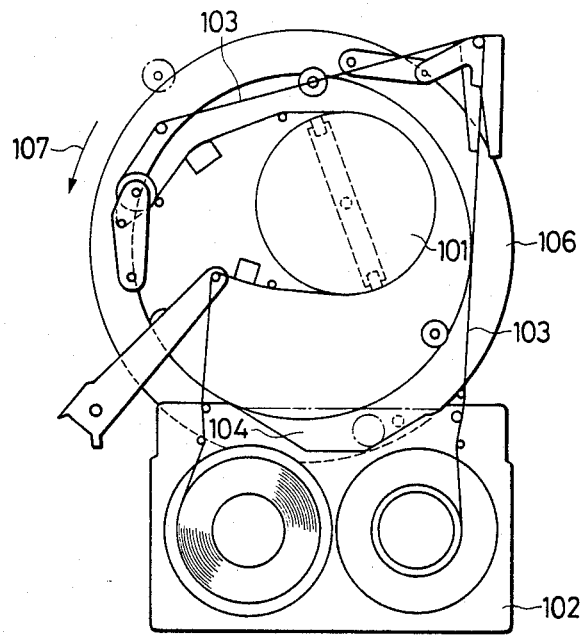
FIG. 1 is a plan view of a mechanism for loading a magnetic tape in a magnetic recording and reproducing apparatus in a prior art.
Figure 2:
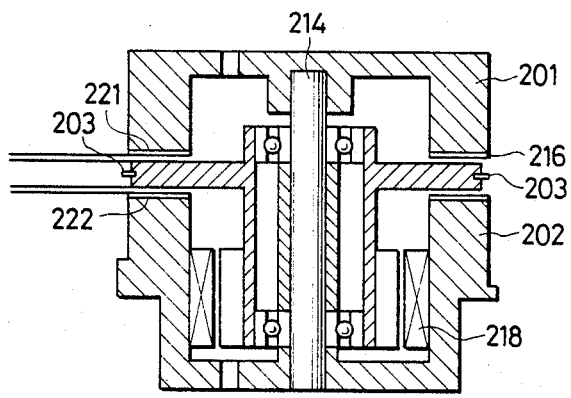
FIG. 2 is a sectional view showing an example of a rotating head mechanism in a prior art.
Figure 3:
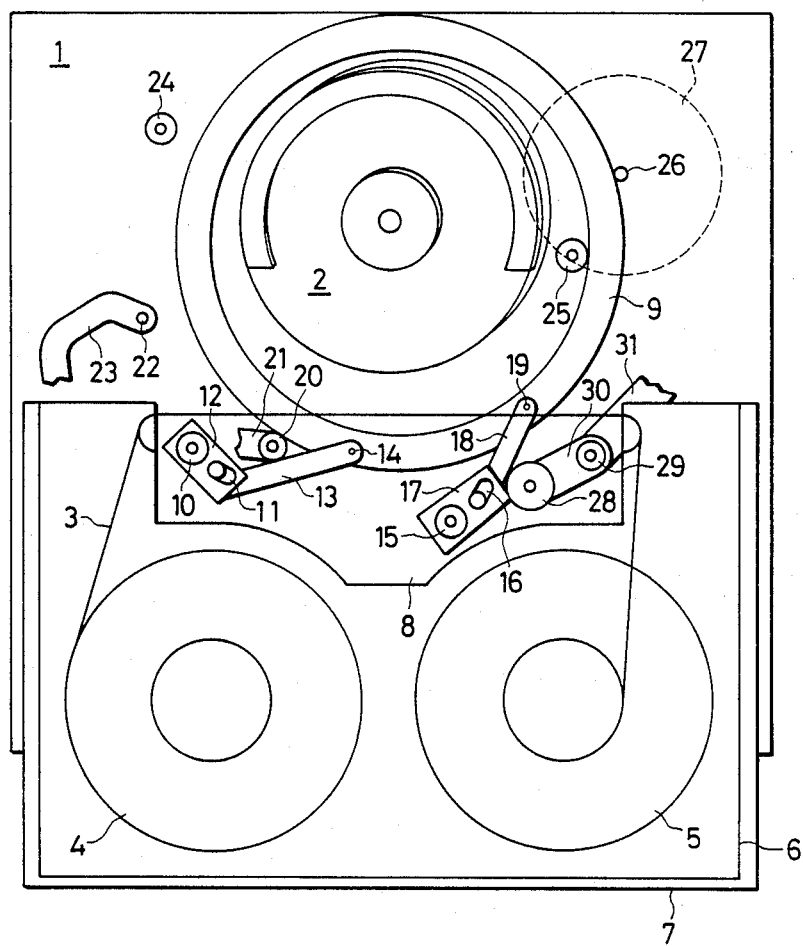
FIG. 3 is a plan view showing the general construction of a magnetic recording and reproducing apparatus in an embodiment of the present invention.

FIG. 3 is a general plan view of a magnetic recording and reproducing apparatus according to the present invention, and it shows a condition before a cassette 6 is inserted. In the figure, numeral 2 designates a rotating head device in which magnetic heads are mounted, numeral 3 a tape, numeral 4 a delivery reel, numeral 5 a take-up reel, and numeral 6 the cassette in which the delivery reel 4 and the take-up reel 5 having the tape 3 wound thereon are built. The cassette 6 has an opening 8 inside the tape 3 which is extended at the front thereof. As will be stated later, the tape 3 extended at the front is covered with a lid in a state under which the cassette is drawn out of the apparatus.

On a main chassis 1 with the rotating head device 2, etc. placed thereon, a subchassis 7 is slidably mounted as will be stated later. The cassette 6 is set at a predetermined position shown in FIG. 3 on the subchassis 7 by means of a cassette elevator (not shown). At this time, roller type tape guides 10 and 15, tilted tape guides 11 and 16, a pinch roller 28, and pull-out rollers 20 and 29 are inserted in the opening 8 of the cassette 6.

Meanwhile, on the main chassis 1, there are placed a loading ring 9 which is turnably supported around the rotating head device 2, a capstan 26 which holds a motor 27 coaxially under it in order to drive the tape 3, and roller type tape guides 24 and 25. The loading ring 9 is driven in a loading direction and an unloading direction through a speed-down mechanism etc. by a driving source such as the motor. The roller type tape guide 10 and the tilted tape guide 11 are planted on a base 12, and are supported so as to be turnable about a pin 14 on the loading ring 9 through an arm 13. Likewise, the roller type tape guide 15 and the tilted tape guide 16 are planted on a base 17, and they are supported so as to be turnable about a pin 19 on the loading ring 9 through an arm 18. The bases 12 and 17 are guided by movement track-controlling means such as guide plates (not shown) in the course of loading and unloading. The pull-out roller 20 is disposed on an arm 21, which is turnably supported on the main chassis 1. Likewise, a base 30 on which the pinch roller 28 and the pull-out roller 29 are planted are supported on an arm 31, which is turnably supported on the main chassis 1.

Figures 4, 5:
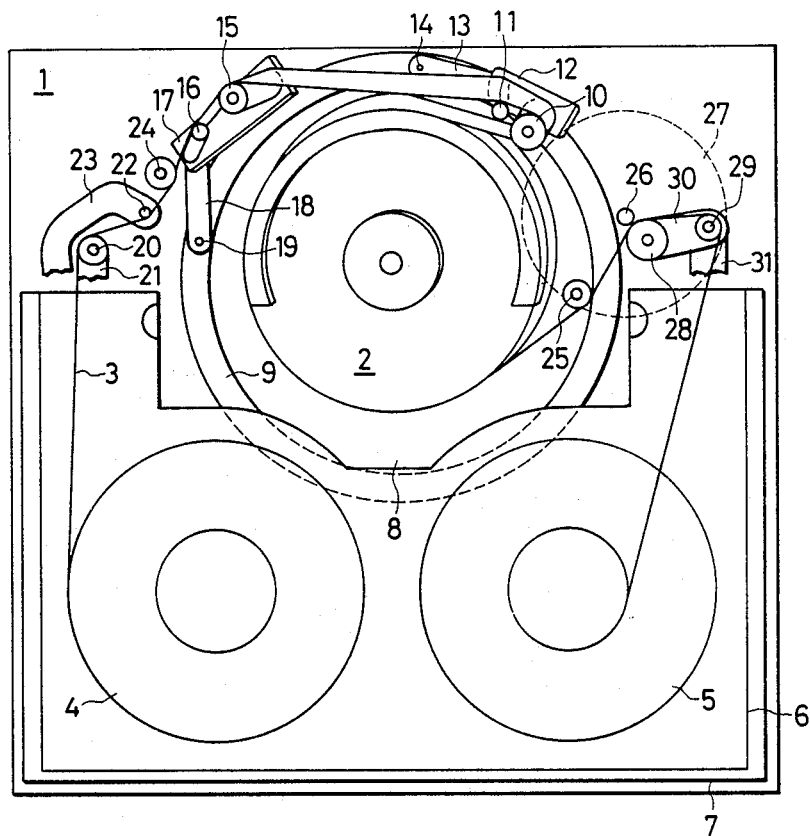
FIG. 4 is a plan view of a condition when loading of a magnetic tape has been completed in the apparatus shown in FIG. 3.
FIG. 5 is a side view showing the relation between a cassette and a rotating head device for illustrating an embodiment of the present invention.

FIG. 4 is a plan view showing the parts after loading of the tape has been completed in the magnetic recording and reproducing apparatus shown in FIG. 3. In loading the tape 3, a group of tape guides consisting of the tape guides 10, 11, 15 and 16 are first moved by the turning of the loading ring 9, from the positions shown in FIG. 3 within the opening 8 of the cassette 6 to positions shown in FIG. 4 at which the winding of the tape round the rotating head device 2 is completed. At the initial stage of the movement, the pull-out rollers 20 and 29 and the pinch roller 28 are drawn out by the turning operations of the arms 21 and 31. In a condition under which the loading ring 9 is further turned a predetermined amount until the group of tape guides move nearly to the upper positions outside the opening 8 of the cassette 6 as shown in FIG. 4, the subchassis 7 with the cassette 6 placed thereon is moved toward the rotating head device 2. The movement of the subchassis 7 ends when the rotating head device 2 has entered the opening 8 a predetermined amount. Thereafter, the loading ring 9 is further turned, and the group of tape guides are precisely located and held at the positions shown in FIG. 4. The unloading operation of the tape is performed in a reverse manner. Here, the reason why the movement of the subchassis is ended before the group of tape guides completes the loading, is to prevent slack in the tape at the time of the completion of the loading. The reasons why the subchassis is moved after the loading of the group of tape guides in predetermined amounts as stated above, are to define within the opening 8 a space into which rotating head device 2 gets and to prevent the slack in the tape with the subchassis stopped from moving at the time of the completion of the unloading.

The traveling path of the tape after the completion of the loading is as shown in FIG. 4. The tape 3 comes out of the delivery reel 4 and advances via the pull-out roller 20, a tension pin 22 for detecting a tape tension, the roller type tape guide 24, and the tilted tape guide 16, at which the tape turns so as to rise, and then extends via the roller type tape guide 15, the tilted tape guide 11, and the roller type tape guide 10 until it leads to the rotating head device 2. The tape 3 is wound here so as to gradually lower, and on the exit side of the rotating head device 2, it is guided without any twist to the same level as that of a tape roll in the cassette 6. Thereafter, the tape 3 is taken up by the take-up reel 5 via the roller type tape guide 25, the capstan 26 and the pinch roller 28 between which the tape is held in pressed contact, and the pull-out roller 29.

FIG. 5 is a side view showing the relation between the cassette and the rotating head device for illustrating the essential portions of the magnetic recording and reproducing apparatus according to the present invention. Numeral 1 designates the main chassis, numeral 2 the rotating head device, numeral 6 the cassette, numeral 7 the subchassis, numeral 8 the opening, numeral 32 a front lid, numeral 33 an inner lid, numeral 34 a lower fixed cylinder, numeral 35 an upper fixed cylinder, symbol 35a a recess, numeral 36 a rotating head, and numeral 85 a tape lead.

Referring to the figure, the rotating head device 2 is basically composed of two elements; the lower fixed cylinder 34 and the upper fixed cylinder 35. The plurality of rotating heads 36 are disposed in the interspace between the two opposing cylinders in a manner to slightly protrude beyond the outer peripheral surfaces of the cylinders. In addition, the cassette 6 is provided with a tape covering lid for the purpose of protecting the tape which is stretched in front of this cassette, and the structure of the lid is composed of the front lid 32 and the inner lid 33 as illustrated in the figure. In the state in which the cassette 6 is set in the apparatus, the front lid 32 and the inner lid 33 are open and overlie the opening 8, while in the state in which the cassette is detached from the apparatus, the tape is enveloped in the front lid 32 and the inner lid 33. Accordingly, when it is intended to insert and arrange the rotating head device 2 in the opening 8, the position of the lid structure forms a restrictive condition in height. In order to avoid this drawback, the part of the upper fixed cylinder 35 of the rotating head device 2 opposing to the lids 32 and 33 is cut away to configure the recess 35a.

Next, the construction of the rotating head device 2 will be described with reference to FIG. 6.

Figure 6:
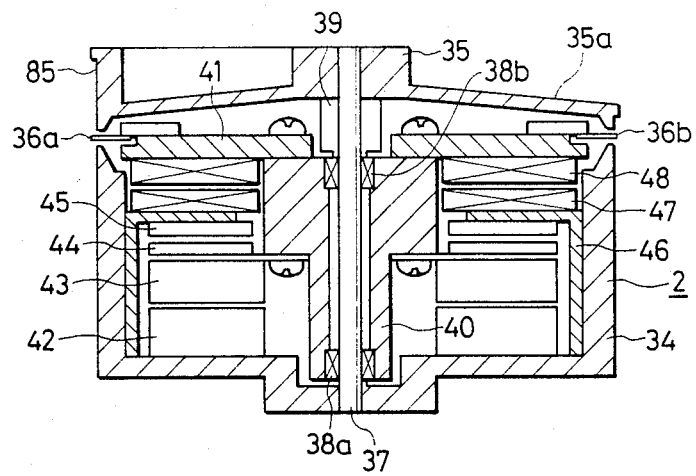
FIG. 6 is a sectional view of a rotating head device in an embodiment of the present invention.

FIG. 6 is a sectional view of the rotating head device according to the present invention. Numeral 2 indicates the rotating head device, numeral 34 the lower fixed cylinder, numeral 35 the upper fixed cylinder, symbol 35a the recess, symbols 36a and 36b the heads, numeral 37 a shaft, symbols 38a and 38b bearings, numeral 39 a stopper, numeral 40 a disc, numeral 41 a rotating cylinder, numeral 42 a stator, numeral 43 a rotor, numeral 44 an FG (frequency generator) magnet, numeral 45 an FG coil, numeral 46 a holder, numeral 47 a fixed side transformer, and numeral 48 a rotating side transformer.

Referring to the figure, the shaft 37 is pressedly fitted in the lower fixed cylinder 34, and the upper fixed cylinder 35 is concentrically fixed to the upper end of the shaft. The disc 40 which is rotatably supported round the shaft 37 by the bearings 38a and 38b is arranged between the upper and lower fixed cylinders 34 and 35, and an appropriate preload is imposed on the bearings 38a and 38b by the stopper 39. The rotor 43 of the motor is unitarily fixed to the lower part of the disc 40, and it is arranged in opposition to the stator 42 fixed on the bottom of the lower fixed cylinder 34, so as to drive and rotate the disc 40. Besides, the magnet 44 of an FG (Frequency Generator) for detecting the revolutions of the motor is mounted on the rotor 43 and rotates together with the rotor 43. It confronts the FG coil 45 mounted on the holder 46 disposed on the inner wall of the lower fixed cylinder 34, so as to generate the revolution signal of the motor.

Meanwhile, the rotating cylinder 41 which carries the heads 36 is fixed on the disc 40. The rotating side transformer 48 is bonded to the lower surface of the rotating cylinder 41 and confronts the fixed side transformer 47 bonded to the holder 46, so as to transfer signals from and to the heads 36.

According to the construction of the rotating head device in the present embodiment, only the heads come into rotating contact with the tape. The rotating accuracy is improved because the heads are less susceptible to fluctuations in the tape tension, so that the driving motor can have its inertia lowered and its power lowered. Moreover, since the upper fixed cylinder 35 is supported by the shaft 37, the concentricity between the upper and lower fixed cylinders can be readily attained, and the efficiency of assemblage can be raised. Further, since the recess of the upper fixed cylinder can be formed beforehand at the stage of the molding of the material of this cylinder, an increase in the cost of manufacture is not incurred.

Besides, the upper fixed cylinder 35 has the lead 85 at the upper part thereof, and the stepped part of the lead radially protruding beyond the traveling plane of the tape 3 regulates the traveling height position of the tape 3. Accordingly, when the magnetic heads 36 scan the tape 3 obliquely during the traveling of the loaded tape 3, the rubbing forces thereof act in the direction of pressing the tape 3 against the lead 85. As a result, the tape 3 travels stably along the lead 85.

Usually a tape is wound obliquely and helically with respect to a rotating head device, and in ordinary systems, the tape enters from above and egresses downwards, that is, magnetic heads scan from the lower end side toward the upper end side of the tape. Accordingly, the wound state of the tape round the rotating head device is such that a part wound round an upper cylinder decreases more as exit side of the device comes nearer.

Accordingly, in case of performing the rotating head device as in the present invention, the traveling loop of the tape to be obliquely and helically wound round the rotating head device is set as a path which rises while turning toward the back of the rotating head device as viewed from a cassette on the entrance side of the rotating head device, so that the tape wound round the rotating head device at a part opposing to the front of the cassette becomes substantially even with a tape roll within the cassette. With such an arrangement, the rotating head device lies at a comparatively high position in an apparatus. Since, however, the portion of the upper cylinder confronting the cassette is recessed only at a part where the tape is not wound, the recess of the upper cylinder lies below the inner lid or top case of the cassette, and the rotating head device and the cassette can be arranged in overlapping fashion. It is accordingly possible to reduce the horizontal area of the apparatus to the utmost limit while the whole apparatus is thinned.

Figure 7:
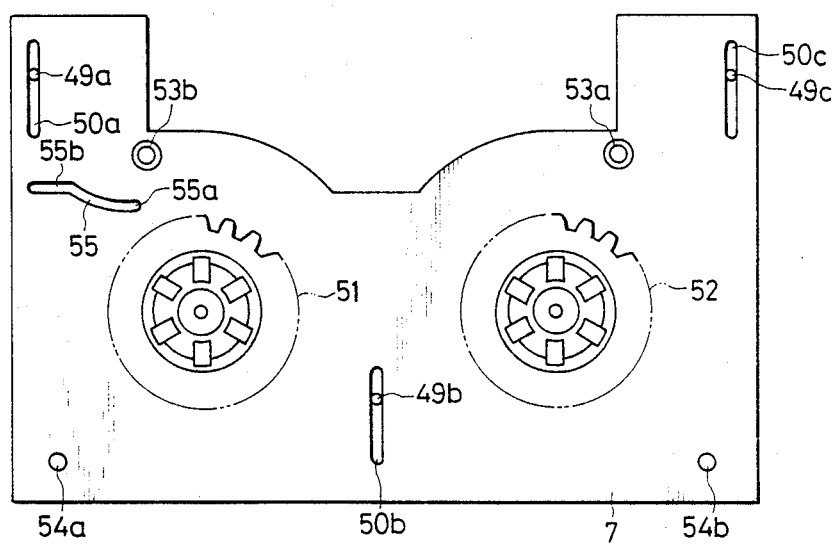
FIG. 7 is a plan view of a subchassis.

FIG. 7 is a plan view showing the basic configuration of the subchassis 7. Numeral 51 designates a delivery reel bed which engages the delivery reel 4, and numeral 52 a take-up reel bed which engages the take-up reel 5. Referring to the figure, when the cassette 6 is placed on the subchassis 7, it is positioned and held by positioning pins 53a, 53b and leveling pins 54a, 54b. In addition, three slots 50a, 50b and 50c are provided at end parts of the subchassis 7, and this subchassis is so supported as to be slidable in the directions of the slots 50a, 50b and 50c by means of guide pins 49a, 49b and 49c disposed on the main chassis 1, respectively. A cam groove 55 is a guide groove for driving the subchassis 7, and the driving method will be described with reference to FIG. 8.

Figure 8:
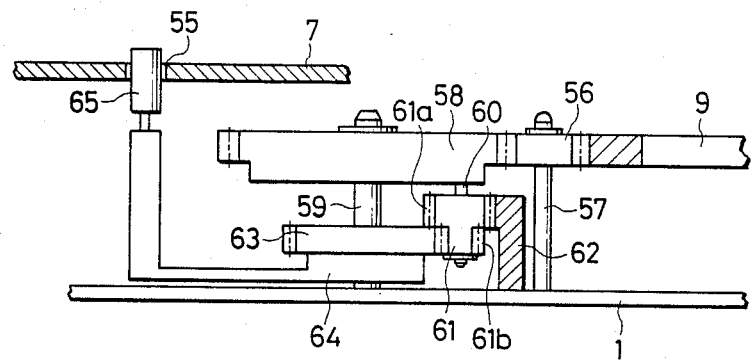
FIG. 8 is a side view showing a subchassis driving portion.

FIG. 8 is a side view illustrative of driving parts for the subchassis. Numeral 1 denotes the main chassis, numeral 7 the subchassis, numeral 9 the loading ring, numeral 55 the cam groove, numeral 56 a gear, numeral 57 a shaft, numeral 58 a gear, numeral 59 a shaft, numeral 60 a shaft, numeral 61 a gear, symbols 61a and 61b gear portions, numeral 62 a gear, numeral 63 a gear, numeral 64 an arm, and numeral 65 a pin. Referring to the figure, when the loading ring 9 is turned, the gear 56 rotates around the shaft 57 which is supported on the main chassis 1, and the gear 58 which is similarly rotatably supported on the shaft 59 which is likewise supported on the chassis 1, is turned. The lower surface of the gear 58 is provided with the shaft 60, around which the gear 61 is mounted for rotation. The gear 61 is formed with the gear portions 61a and 61b which have unequal numbers of teeth, and the gear portion 61a having the larger number of teeth is in mesh with the gear 62 which is fixed to the main chassis 1. Thus, while revolving round the shaft 59 together with the gear 58, the gear 61 revolves on its axis or round the shaft 60. Further, the gear portion 61b meshes with the gear 63 which is rotationally supported on the shaft 59. Therefore, the gear 63 revolves with a great deceleration according to the principle of a so-called mechanical paradox internal gear. Further, the gear 63 is unitarily furnished with the arm 64, and the pin 65 disposed at the distal end of the arm 64 engages the cam groove 55 of the subchassis 7, so that the subchassis 7 is slidden by the turning of the arm 64. Besides, the cam groove 55 consists of an arcuate part 55a and a straight part 55b as shown in FIG. 7. At the initial stage of the loading and at the completion of the loading, the pin 65 engages the arcuate part 55a of the cam groove 55. On this occasion, the pin 65 moves within the arcuate part 55a, but the subchassis 7 does not slide.

Figure 9:
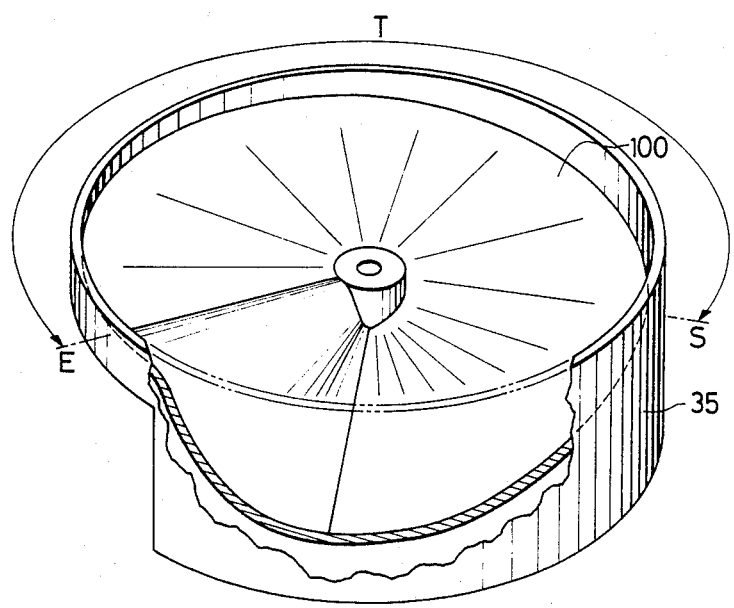
FIG. 9 is a perspective view of an upper fixed cylinder.

FIG. 9 is a perspective view of the upper fixed cylinder, in which numeral 35 designates the upper fixed cylinder and numeral 100 the opposition plane between the rotating heads and the head carrying cylinder, the illustration being vertically reversed to that of FIG. 5. Referring to FIG. 9, the opposition plane 100 of the upper fixed cylinder 35 opposing to the cylinder for carrying the rotating heads is in such a wedge shape that the clearance of the opposing plane from the rotating cylinder narrows gradually from the start part toward the end part of the winding.

Figure 10:
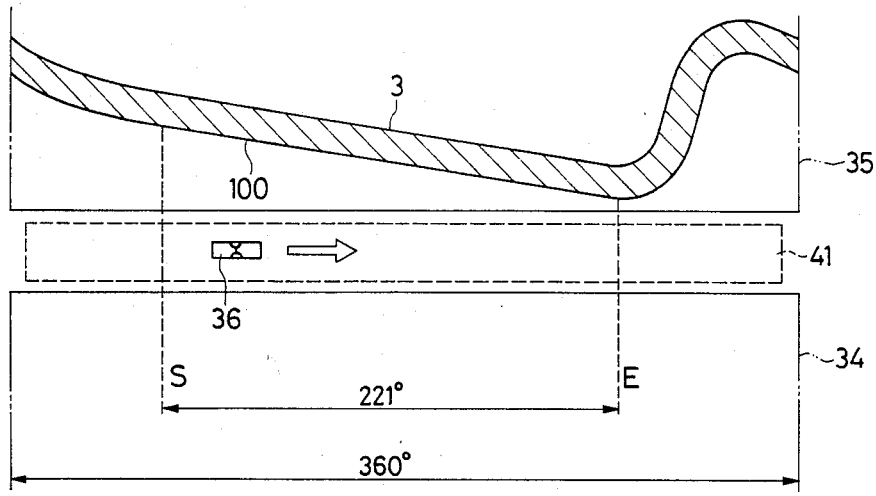
FIG. 10 is an plan view to an enlarged scale showing in section the surface of the upper fixed cylinder opposing to a head mounting cylinder.

FIG. 10 is an expansion plan illustrative of the opposition plane of the upper fixed cylinder 35 opposing to the cylinder 41 for carrying the magnetic heads 36. The opposition plane 100 gradually approaches the head carrying cylinder 41 from the winding start part S toward the winding end part E of the tape winding T. In the illustrated example, the winding angle of the tape 3 is set at 221° in conformity with the standards of the VTR of 8 mm-FORMAT. Accordingly, the air which is introduced by the high-speed rotation of the rotating cylinder 41 has its pressure raised more by the wedge-shape effect of the opposition plane 100 as the end part E of the tape winding comes nearer.

Figure 11A:
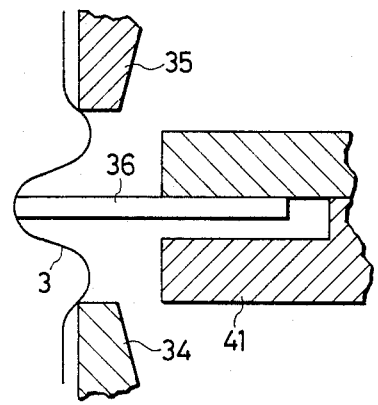
Figure 11B:
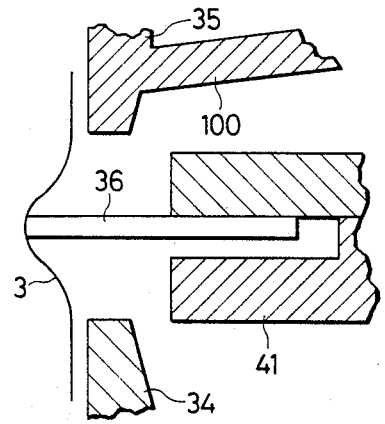
FIG. 11(b) is a sectional view showing the same relation in an embodiment of the present invention.

FIG. 11(a) and FIG. 11(b) are conceptual diagrams for elucidating the effect according to the present invention, and the former illustrates the prior art, while the latter illustrates the present invention. As depicted in FIG. 11(a), with the prior art, especially in the tape winding end part of high tape tension, air films are difficult to be formed between the tape 3 and the respective cylinders 34, 35, and the tape 3 comes into touch with the end parts of the upper fixed cylinder 35 and the lower fixed cylinder 34. In contrast, as depicted in FIG. 11(b), according to the present invention, desired air layers can be formed between the tape and the cylinders even at the tape winding end part. Thus, according to the present invention, (1) the rotating head device can be arranged in the cassette opening in overlapping fashion to the utmost limit, so that the apparatus can be reduced in size and lightened in weight. (2) Since the tape traveling loop can be set as a path rising from the cassette on the entrance side of the rotating head device and as a parallel path on the exit side, the rotating head device can have its inclination angle reduced and can be arranged above the cassette, so that the apparatus can be thinned. Owing to the parallel traveling path on the exit side, the tape guide on the exit side can be implemented as the roller type so as to decrease the load of tape traveling. It is accordingly possible to achieve the stable traveling of a thin tape and the reduction of the size and the lightening of the weight of the driving motor. Besides, (3) it is possible to discharge the air of low pressure at the start part of the tape winding and the air of high pressure at the end part of the winding, and the air film of uniform thickness can be formed over the entire tape winding. Accordingly, the traveling load of the tape can be decreased to stabilize the tape traveling and to prevent the damage of the tape, and a uniform and favorable head-to-tape contact can be attained over the entire tape winding. Further, (4) any new component is not required, and the opposition plane of the fixed cylinder can also be worked unitarily at the step of molding the material of this fixed cylinder, so that the present invention does not incur increases in the weight and the working cost.

Now, another embodiment of the present invention will be described.

Figure 12:
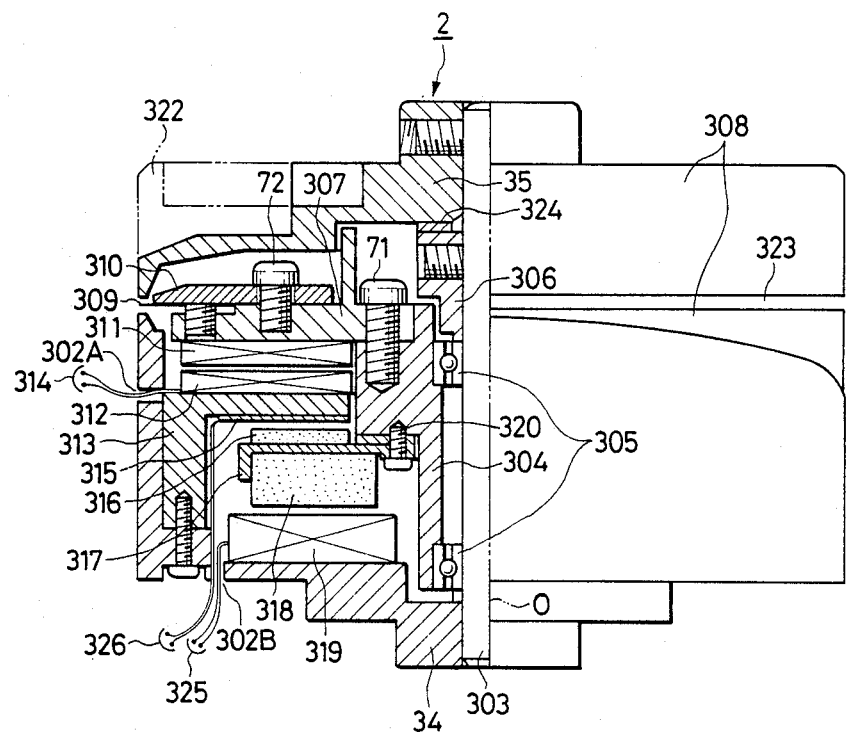
FIG. 12 is a vertical view in half section of a rotating head device according to an embodiment of the present invention.

First, FIG. 12 is a half vertical sectional view of a rotating head device according to the other embodiment of the present invention, in which the vertical sectional view of the rotating head device 2 is shown at the left of a center line 0, while the contour thereof is shown at the right of the center line O.

Referring to FIG. 12, numeral 34 designates a lower fixed cylinder, and numeral 303 a fixed shaft which stands upright centrally of the lower fixed cylinder and whose axis corresponds to the center line 0. Numeral 304 indicates a rotary member which is rotatable about the fixed shaft 303, numeral 305 radial ball bearings, numeral 306 a preload fixture which exerts a preload on the radial ball bearings 305, and numeral 307 a rotary disc which is fixed to the rotary member 304 by bolts 71 and on which a plurality of magnetic heads 309 are carried.

Numeral 308 denotes a tape traveling plane at the outer peripheries of cylinders, and numeral 310 a head base for supporting the magnetic heads 309. Numeral 311 denotes a rotating side rotary transformer, and numeral 312 a stationary side rotary transformer, and these rotary transformers constitute flat opposition type rotary transformers for transmitting signals to the magnetic heads 309.

Numeral 313 represents a stator base, numeral 314 signal lines for connecting the heads, the stationary side rotary transformer, etc. with a circuit board (not shown), numeral 315 the FG coil of a frequency generator (hereinbelow, termed "FG") for controlling the rotary disc 307, numeral 316 the FG magnet, numeral 317 a magnet holder, numeral 318 the motor magnet of a brushless motor for controlling the rotation of the rotary disc 307, numeral 319 the motor coil of the brushless motor, and numeral 320 a motor rotor base.

Numeral 35 indicates an upper fixed cylinder which is mounted on the upper part of the fixed shaft 303, numeral 322 a recess in a two-dot chain line which is formed in the upper fixed cylinder 35, numeral 323 an interspace which is defined between the upper fixed cylinder 35 and the lower fixed cylinder 34 and through which the magnetic heads 309 pass, numeral 324 a spacer, numeral 325 motor wiring, and numeral 326 FG wiring.

Next, the constructions of the various components will be described.

The fixed shaft 303 stands upright centrally of the lower fixed cylinder 34. The rotary member 304 has the radial ball bearings 305 fitted into the two places of the upper and lower parts thereof by such an expedient as pressing-in or quenching, whereby it is snugly fitted on the fixed shaft 303 so as to be rotatable about this fixed shaft. The preload fixture 306 is fixed to the fixed shaft 303 by setscrews under the state under which a downward load is exerted, whereby the radial ball bearings 305 are preloaded to suppress shaking in the thrust direction thereof.

The rotary disc 307 is fixed to the upper part of the rotary member 304 by bolts 71, the plurality of head bases 310 are fixed to the upper surface of the rotary disc 307 by bolts 72, and the magnetic head 309 protruding out beyond the tape traveling plane 308 are carried on the head bases 310.

Mounted on the lower surface of the rotary disc 307 is the flat, rotating side rotary transformer 311 which is electrically connected with the magnetic heads 309. The stator base 313 fixed to the lower fixed cylinder 34 has a surface parallel to the lower surface of the rotary disc 307, and is provided with an opening for holding a clearance relative to the rotary member 304. This stator base 313 carries the flat, stationary side rotary transformer 312 on the upper surface of its flat portion parallel to the lower surface of the rotary disc 307. In addition, the signal lines 314 connected with the winding of the stationary side rotary transformer 312 are led out of the rotating head device 2 through an opening 302A which is provided in the side wall of the lower fixed cylinder 34 avoiding the tape traveling plane 308, whereby they can be connected to a magnetic signal recording/reproducing circuit (not shown) disposed outside.

Carried on the lower surface of the flat portion of the stator base 313 parallel to the rotary disc 307 is the flat FG coil 315, in opposition to which the flat FG magnet 316 is arranged. More specifically, the FG magnet 316 is carried on the upper surface of the flat magnet holder 317, the flat motor magnet 318 is carried on the lower surface of the magnet holder 317, and the flat motor coil 319 is carried on the inside bottom of the lower fixed cylinder 34 in opposition to the motor magnet 318. A motor rotor unit is constructed of the FG magnet 316, the magnet holder 317, the motor magnet 318, and the motor rotor base 320 fixed to the magnet holder 317, and it is fixed to the rotary member 304 by screws. Thus, the radial vibrations of the motor magnet 318 and the FG magnet 316 with respect to the axis of rotation of the rotary member 304 can be adjusted.

The rotor unit of the rotating head device 2 of the present embodiment is constructed of the aforementioned rotary member 304, rotary disc 307, magnetic heads 309, head bases 310, rotating side rotary transformer 311, FG magnet 316, magnet holder 317, motor magnet 318 and motor rotor base 320.

In the upper fixed cylinder 35, the part 322 indicated by the two-dot chain line corresponding to a part of the non-winding portion of a magnetic tape is formed as the recess for avoiding the interference of this fixed cylinder with the opposite component. This upper fixed cylinder 35 is locked by screws to the upper part of the fixed shaft 303 so as to ensure the required interspace 323 which serves as the passing region of the magnetic heads 309 during the rotation of the rotor unit. The height of the interspace 323 is adjusted by selecting the thickness of the spacer 324.

The motor wiring 325 functions to supply electric power for driving the motor, while the FG wiring 326 functions to take out signals from the FG, and both are led out of the rotating head device 2 through an opening 302B which is provided in the bottom of the lower fixed cylinder 34.

As to the rotating head device 2 thus constructed, the operation will be described below.

The structure of the rotating head device 2 of the present embodiment is such that the rotary transformers, the FG unit and the brushless motor unit are all built in on the side of the lower fixed cylinder 34 with respect to the rotating plane of the magnetic heads 309.

Since the rotating side rotary transformer 311 and the stationary side rotary transformer 312 are implemented as the flat opposition type, the working precision of the rotary transformers and the mounting precision thereof on the rotating head device 2 become high, and the gap between the rotating side and stationary side rotary transformers can be set at a very small value. Moreover, the rotary transformers which handle feeble magnetic signals are magnetically shielded by the stator base 313 from the motor unit and the FG unit which are attended with intense magnetic fields. As a result, the degradations of signal-to-noise ratios in the rotary transformers attributed to magnetic field leakages from the motor unit and the FG unit are suppressed. It is therefore possible that the opposition area of the rotary transformers for signal transmission per channel be suppressed to a small area.

Besides, since the rotary transformers 311 and 312 are arranged under the rotary disc 307, a large cross-sectional area enclosed with the inner peripheral surface of the lower fixed cylinder 34 and the outer peripheral surface of the rotary member 304 can be utilized as the opposition area for the signal transmission between both the rotary transformers 311 and 312, and the apparatus can be constructed as being effective for the transmission of multi-channel signals, etc.

For these reasons, the rotating head device 2 is concluded as having a cylinder structure which carries the rotary transformers capable of transmitting the multi-channel signals and which can achieve reduction in size.

Next, the construction and functional effects of the magnetic recording and reproducing apparatus in which this rotating head device 2 is installed will be described with reference to FIGS. 13(a) and 13(b).

Figure 13A:
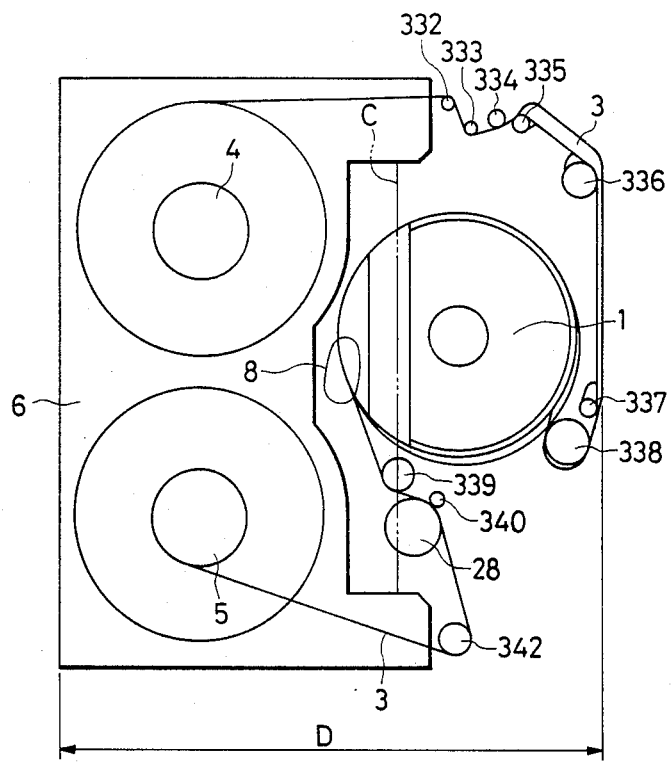
Figure 13B:
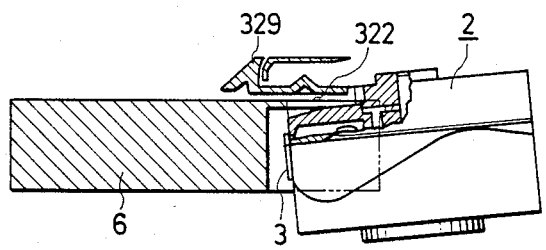
FIG. 13(b) is a side view thereof in partial section.

FIG. 13(a) is a schematic plan view of the magnetic recording and reproducing apparatus in which the rotating head device in FIG. 12 is installed, while FIG. 13(b) is a partially-sectional side view thereof.

In FIGS. 13(a) and 13(b), numeral 3 designates the magnetic tape, numeral 6 a tape cassette proper, numeral 8 a tape cassette opening, numeral 329 a tape cassette lid, numeral 4 a tape delivery reel, numeral 332 an incoming side tape leading pin, numeral 333 a restraint guide, numeral 334 a tension pin, numerals 335 and 337 tilted pins, numerals 336, 338 and 339 guide rollers, numeral 340 a capstan, numeral 28 a pinch roller, and numeral 342 an outgoing side leading pin.

The magnetic tape 3 wound round the delivery reel 4 is guided by the tape guides mentioned above, is caused to travel by the capstan 340 and the pinch roller 28, and is taken up round a take-up reel 5.

The recess 322 of the upper fixed cylinder 35 is set at the position which avoids the tape cassette lid 329 for drawing out the magnetic tape 3 (the front edge C of this cassette lid is indicated by a two-dot chain line), the protrusions of the tape cassette proper 6, etc., thereby permitting the tape cassette opening 8 and the rotating head device 2 to overlap, and hence, the horizontal area of the mechanism portion of the magnetic recording and reproducing apparatus with the rotating head device 2 installed thereon can be sharply reduced by diminishing a dimension D.

According to the foregoing construction, only the upper fixed cylinder is arranged above the rotary disc which carries the plurality of magnetic heads, so that the recess can be considerably freely formed except in the winding portion of the magnetic tape. Therefore, it is often possible to locate the recess of the upper fixed cylinder in a place which avoids the tape cassette lid protruding to the side of the rotating magnetic heads.

Thus, the rotating head device can be inserted into the tape cassette opening, and the reduction of the horizontal area of the magnetic recording and reproducing apparatus equipped with the rotating head device becomes possible.

Moreover, the brushless motor unit and the frequency generator (FG) unit can be magnetically isolated from the rotary transformer unit by the stator base, and noise ascribable to the leaks of the magnetic fields of the motor unit and the FG unit can be eliminated to prevent the degradations of signal-to-noise ratios attributed to the noise, so that the opposition area of the rotary transformers for signal transmission per channel can be reduced.

Furthermore, since the rotary transformers are arranged under the rotary disc, a large area enclosed with the inner peripheral surface of the lower fixed cylinder and the outer peripheral surface of the rotary member can be utilized as the opposition plane for the signal transmission.

In brief, according to this embodiment, it becomes possible to enhance the signal transmission performance of the rotary transformers and to form the recess of the upper fixed cylinder, so that the rotating magnetic heads capable of coping with multi-channeling can be realized in spite of a small diameter. A further effect is that, when the rotating head device is installed on the magnetic recording and reproducing apparatus, the overlap thereof with the tape cassette becomes possible, so the magnetic recording and reproducing apparatus of small horizontal area can be realized.

Next, other embodiments of the present invention will be described with reference to FIG. 14 and FIG. 15.

Figure 14:
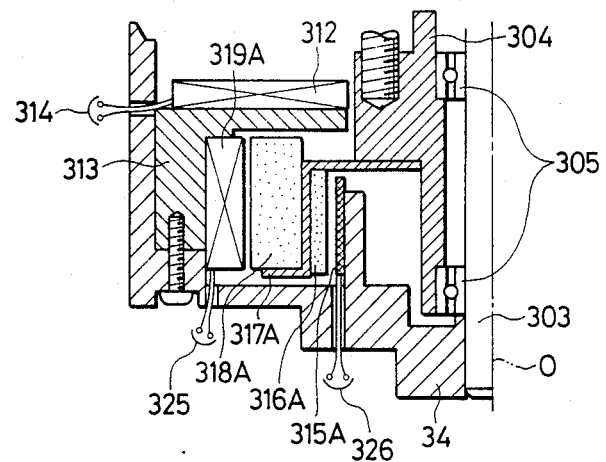
FIG. 14 is a partial view in section of the motor portion and frequency generator portion of a rotating head device according to another embodiment of the present invention.

FIG. 14 is a vertical sectional view of the motor unit and the FG unit of a rotating head device according to another embodiment of the present invention. In the figure, parts with the same symbols as in FIG. 12 are equivalent to those of the embodiment in FIG. 12, and the other parts of the rotating head device not shown are equivalent to the corresponding ones in FIG. 12, so that they shall be omitted from the description.

In the embodiment of FIG. 14, all of an FG coil 315A, an FG magnet 316A, a motor magnet 318A and a motor coil 319A are formed cylindrical, and the motor unit and the FG unit are respectively disposed on an outer side and an inner side with respect to the fixed shaft 303.

According to the embodiment of FIG. 14, the same effects as in the foregoing embodiment of FIG. 12 are expected. Besides, since the motor unit is disposed on the outer side, the mean driving radius of the motor enlarges, and the torque constant thereof is readily enlarged, so that reduction in the size of the motor unit can be achieved, and the height of the motor magnet 318A as well as the motor coil 319A can be diminished. Accordingly, there is the effect peculiar to the present embodiment that the vertical dimension of the rotating head device below the stator base 313 can be lessened.

Figure 15:
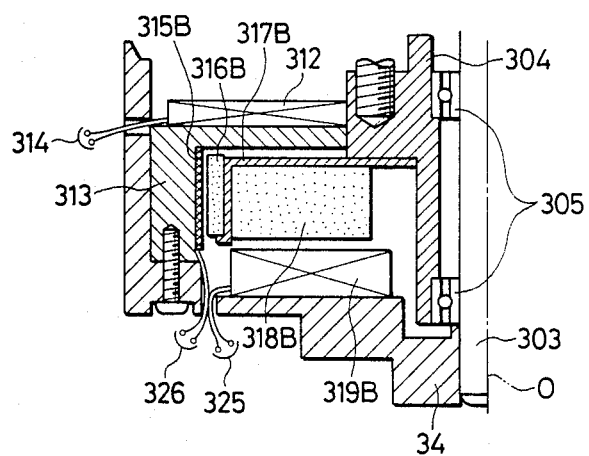
FIG. 15 is a partial view in section of the motor portion and frequency generator portion of a rotating head device according to still another embodiment of the present invention.

FIG. 15 is a vertical sectional view of the motor unit and the FG unit of a rotating head device according to still another embodiment of the present invention. In the figure, parts with the same symbols as in FIG. 12 are equivalent to those of the embodiment shown in FIG. 12, and the other parts of the rotating head device not shown are equivalent to the corresponding ones in FIG. 12, so that they shall be omitted from the description.

In the embodiment of FIG. 15, an FG coil 315B and an FG magnet 316B are formed cylindrical, while a motor magnet 318B and a motor coil 319B are formed flat, and the FG unit and the motor unit are respectively disposed on an outer side and an inner side with respect to the fixed shaft 303.

According to the embodiment of FIG. 15, the same effects as in the foregoing embodiment of FIG. 12 are expected. Besides, since the FG unit is disposed on the outer side, there is the effect peculiar to the present embodiment that FG signals of high accuracy can be produced and that revolutions of high accuracy can be realized.

As stated above, according to the embodiments, notwithstanding that cylinders are of small diameter, rotating magnetic heads capable of coping with multi-channeling can be realized, and when the device is installed on a magnetic recording and reproducing apparatus, it is permitted to overlap a tape cassette, and the rotating head device which can realize the magnetic recording and reproducing apparatus of small horizontal area can be provided.

What is claimed is:

1. A magnetic recording and reproducing apparatus of small size comprising:
   a rotating magnetic head device which includes a plurality of magnetic head mounted for rotational movement along a path which lies in a plane perpendicular to a rotational axis;
   an upper member and a lower member which have outer peripheral surfaces that are separated along a line that is perpendicular to the rotational axis, said peripheral surfaces being concentrically arranged with respect to said rotational axis and positioned to be above and below the plane containing the path of rotation of the magnetic heads;
   a tape cassette housing containing magnetic tape that is guided by said outer peripheral surfaces;
   a loading mechanism which is adapted to draw the magnetic tape from an inserted cassette and to wind said tape around the rotating magnetic head device so that the tape has an annular extent of at least 180°;
   said upper member having a recess in an outer peripheral portion which faces an inserted cassette; and
   means for inserting the cassette housing into said apparatus with part of said cassette housing extending into said recess and overlapping the path of movement of said rotating heads.

2. Apparatus as defined in claim 1, wherein the upper cylinder is fixed and said recess is located on a upper side of said upper cylinder which confronts said tape to be inserted.

3. Apparatus as defined in claim 1, further comprising:
   a main chassis on which said rotating magnetic head device is placed, and
   a subchassis for receiving said cassette which is slidably mounted on said main chassis
   whereby a tape cassette placed thereon can be inserted into said recess provided in said fixed cylinder.

4. Apparatus as defined in claim 1, further comprising:
   means for guiding said magnetic tape in a manner to be disposed so as to surround said rotating magnetic heads and form a predetermined tape travelling loop;
   means associated with the loading mechanism for bringing a group of tape guides into a position opposed to said upper and lower members during opening of said tape cassette by means of a turning of said loading mechanism; and
   means for inserting part of said rotating magnetic head path into said opening of said tape cassette after the turning of said loading mechanism.

5. Apparatus as defined in claim 1, wherein a space between an edge of said upper cylinder facing the rotational path of said magnetic heads has a wedge shape thereby to provide a clearance from said path which narrows gradually from a winding start part toward a winding end part of the magnetic tape that is wound around said upper cylinder.

6. Apparatus as defined in claim 1, wherein the upper and lower cylinders are fixed and further comprising:
   a fixed shaft which extends through respective central parts of said upper cylinder and said lower cylinder,
   a rotary member which is mounted for rotation about said fixed shaft,
   a rotary disc fixed to said rotary member and upon which the magnetic heads are mounted,
   said lower cylinder having a stator base which has a surface parallel to and facing said rotary disc on a side of closer to said lower cylinder to provide a clearance with said rotary disc, and rotary transformers for signal transmission that have opposed exterior planar surfaces with a rotating side disposed on a lower surface of said rotary disc a stationary side disposed on an upper surface of said stator base.

7. Apparatus as defined in claim 6, further including a brushless motor for controlling the rotation of said rotary disc, and a frequency generator for detecting revolutions of said motor, said frequency generator comprising a coil, a magnet and a magnet holder, all positioned in an internal space region which is enclosed by said stator base and said lower fixed cylinder.

* * * * *